No. 776,364. PATENTED NOV. 29, 1904.
C. SONNICHSEN.
RECORDING ATTACHMENT FOR SCALES.
APPLICATION FILED NOV. 7, 1903.

NO MODEL.

Witnesses
Harry L. Amer
Herbert D. Lawson

Inventor
Charles Sonnichsen.
By Victor J. Evans
Attorney

No. 776,364.

Patented November 29, 1904.

UNITED STATES PATENT OFFICE.

CHARLES SONNICHSEN, OF NORTH SAN DIEGO, CALIFORNIA.

RECORDING ATTACHMENT FOR SCALES.

SPECIFICATION forming part of Letters Patent No. 776,364, dated November 29, 1904.

Application filed November 7, 1903. Serial No. 180,221. (No model.)

*To all whom it may concern:*

Be it known that I, CHARLES SONNICHSEN, a citizen of the United States, residing at North San Diego, in the county of San Diego and State of California, have invented new and useful Improvements in Recording Attachments for Scales, of which the following is a specification.

My invention relates to new and useful improvements in attachments for scales; and its object is to provide a simple device of this character which is especially adapted for use in connection with platform-scales and which will accurately count the number of weighing operations and the total weight of all articles weighed upon it.

A further object is to provide a device which will automatically indicate the weight of each article placed upon the scales.

With the above and other objects in view the invention consists in providing an arm upon which are arranged casings, one of which is provided with a series of revoluble disks having numerals arranged thereon, and these disks are driven by suitable mechanism connected to the scale-beam and are adapted to accurately indicate the total amount weighed during two or more weighing operations. The apparatus in this casing also serves to accurately indicate visually the weight upon the scales during each weighing operation. The arm also serves to support a counter of any suitable form which is designed to count the number of weighing operations during a given period.

The invention also consists in the novel construction and arrangement of the several parts, which will be more fully hereinafter described and claimed, and illustrated in the accompanying drawings, in which—

Figure 1:
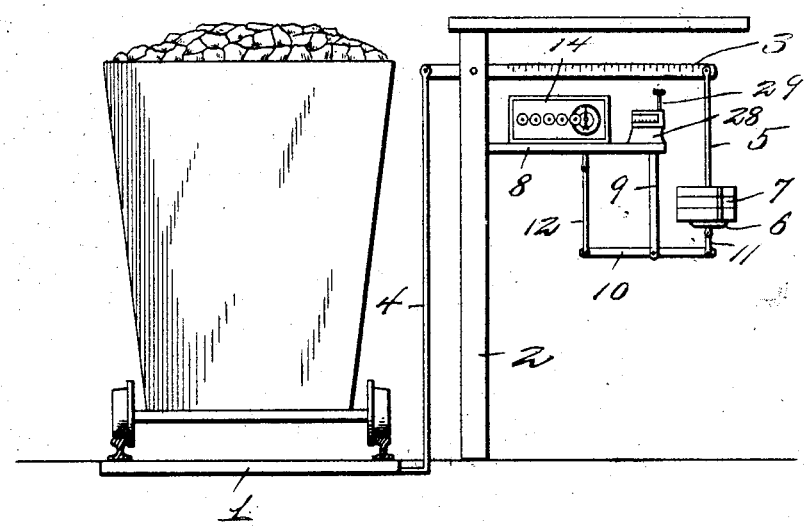
Figure 2:
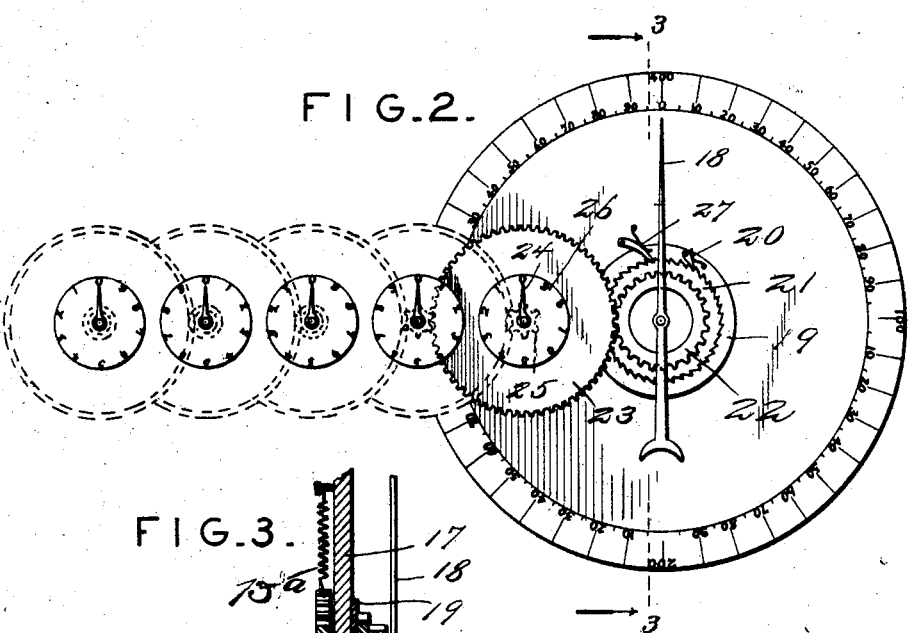
Figure 3:
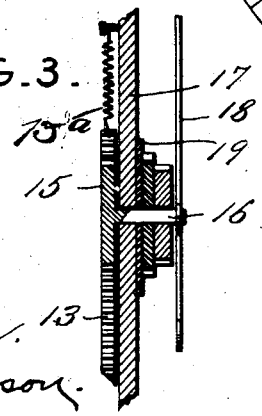

Figure 1 is an elevation of my improved attachment applied to platform-scales. Fig. 2 is an enlarged elevation of the mechanism of the calculating device, some of the gears thereon being shown in dotted lines. Fig. 3 is a section on line 3 3, Fig. 2.

Referring to the figures by numerals of reference, 1 is the platform of the scales, adjacent which is a standard 2, having a graduated beam 3 fulcrumed therein and connected by means of a rod 4 with the platform. A rod 5 is suspended from the beam 3 and has a disk 6 thereon for supporting a suitable number of weights 7. An arm 8 extends laterally from the standard 2 and under the scale-beam 3, and depending from this arm is a hanger 9, in which is fulcrumed a lever 10. One end of this lever is connected to the disk 6 by a link 11, while the other end is connected, by means of a link 12, with a rack 13, slidably mounted within a casing 14, supported upon the arm 8. This rack meshes with a gear 15, having a stem 16, which is revolubly mounted in the front face 17 of the casing and has an index 18 secured thereto. A disk 19 is also secured to the stem 16 and rotates therewith, and secured to this disk is a spring-pressed pawl 20, which normally engages a ratchet-wheel 21, loosely mounted upon the stem 16. Secured to this ratchet-wheel and revoluble therewith is a gear 22, which meshes with a larger gear 23, having an index 24 connected thereto and revoluble therewith. A small gear 25 is secured to and rotates with the gear 23 and is adapted to mesh with a second gear 23, to which is secured an index and a small gear, as above described. A train of these gears is provided, and located in rear of each index 24 is a disk 26, having numerals arranged thereon successively, these numerals preferably ranging from "1" to "10." If desired, a spring-pressed pawl 27 may be pivoted upon the face 17 of the casing 14 and engage the ratchet-wheel 21, so as to prevent the same from returning to its normal position after a weighing operation. Any suitable means, such as a spring 13ª, may be employed for retarding the rotation of the gear 15 and the movement of the rack 13. Mounted on the arm adjacent the casing 14 is a counter 28 of any suitable construction and having a plunger 29 projecting from the top thereof and adapted to be contacted and depressed by the scale-beam 3.

When an object to be weighed is placed upon the platform 1, the outer end of the scale-beam 3 will be raised, as is obvious, and the lever 10, connected thereto, will draw the link 12 and the rack 13 downward. The gear 15 will therefore be rotated and will carry the index 18 therewith, and this index will point to any one of a series of graduations arranged upon the face of the casing 14 and will accurately indicate the weight of the object upon the platform. As the disk 19 rotates with the stem, it is obvious that the pawl 20 will cause the ratchet-wheel 21 to rotate therewith also and the gear 22 will partly turn the gears 23 and move the indexes 24 proper distances to indicate upon the disks 26 the weight of the object upon the platform. The downward movement of the scale-beam 3 during its operation will depress the plunger 29, and the counter connected thereto will indicate that one weighing operation has been performed. When the object has been removed from the platform 1, the parts will return to their normal positions, with the exception of the gears 22 and 23 and the ratchet-wheel 21. The pawl 20 will slip backward over the teeth of the ratchet-wheel, and the index 18 will move back to its normal position. When another object is placed upon the platform, the operation above described will be repeated. If desired, the return of the index 18 to its normal position after a weighing operation can be prevented by placing the pawl 27 in engagement with the ratchet-wheel 21. It will be understood that each weighing operation will rotate the indexes 24, so that at the completion thereof the sum indicated thereby will equal the total weights of the objects weighed. The attachment can be readily disconnected from the scales by detaching the link 11 from the disk 6, and said scales can then be used independently of the indicating mechanism by the use of the weights 7.

The scales can be used without the weights 7; but where the weights 7 are used in connection with the indicating apparatus the beam 3 is weighted, so as to counterbalance a load slightly less than the average, and the indexes 18 and 24 will accurately indicate the remaining weight of the load.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. In a device of the character described, the combination with a standard having an arm thereon and a scale-beam fulcrumed within the standard, of a casing arranged upon the arm, a train of gears therein, each gear having an index, a stem revolubly mounted within the first gear of the train, a ratchet-wheel loosely mounted upon the stem and connected to said first gear, a pawl connected to the stem and normally engaging the ratchet-wheel, an index and a gear secured to the stem, a rack engaging the last-mentioned gear, a rod depending from the scale-beam, a hanger depending from the arm, a lever fulcrumed in the hanger, and link connections between the lever and the rod and rack respectively.

2. In a device of the character described, the combination with a standard having an arm thereon, of a scale-beam fulcrumed within the standard, a counter upon the arm and adapted to be operated by the scale-beam, a casing on the arm, a train of gears within the casing, each gear having an index, means for preventing the rotation of the gears in one direction, a stem revolubly mounted in the first gear of the train, an index and a gear secured thereto, a rack engaging the last-mentioned gear, a hanger depending from the arm, a lever, fulcrumed thereon, and rods and links connecting the lever with the rack and scale-beam.

In testimony whereof I affix my signature in presence of two witnesses.

CHARLES SONNICHSEN.

Witnesses:
　Geo. F. Saunders,
　George Wahl.